United States Patent [19]

Ohmori et al.

[11] Patent Number: 4,587,809

[45] Date of Patent: May 13, 1986

[54] PREMIXING SWIRLING BURNER

[75] Inventors: Takashi Ohmori; Isao Sato; Yoji Ishibashi; Yoshimitsu Minakawa; Michio Kuroda; Zensuke Tamura, all of Hitachi, Japan

[73] Assignee: Hitachi, Ltd., Tokyo, Japan

[21] Appl. No.: 677,244

[22] Filed: Dec. 3, 1984

Related U.S. Application Data

[63] Continuation of Ser. No. 386,278, Jun. 8, 1982, abandoned.

[30] Foreign Application Priority Data

Jun. 15, 1981 [JP] Japan .................................. 56-90863

[51] Int. Cl.[4] ............................ F02C 1/00; F02G 3/00

[52] U.S. Cl. ........................................ 60/737; 60/748; 60/760

[58] Field of Search ................. 60/737, 740, 741, 743, 60/744, 748, 760

[56] References Cited

U.S. PATENT DOCUMENTS

| | | | |
|---|---|---|---|
| 3,530,667 | 9/1970 | Bryan | 60/743 |
| 3,853,273 | 12/1974 | Bahr et al. | 60/748 |
| 3,877,863 | 4/1975 | Penny | 60/737 |
| 3,904,119 | 9/1975 | Watkins | 60/737 |
| 3,915,387 | 10/1975 | Carvel et al. | 60/748 |
| 3,946,552 | 3/1976 | Weinstein et al. | 60/743 |
| 4,194,358 | 3/1980 | Stenger | 60/748 |
| 4,197,831 | 4/1980 | Black | 431/353 |
| 4,408,461 | 10/1983 | Bruhwiler et al. | 60/737 |
| 4,426,841 | 1/1984 | Cornelius et al. | 60/737 |

FOREIGN PATENT DOCUMENTS

| | | | |
|---|---|---|---|
| 2085147 | 4/1982 | United Kingdom | 60/748 |

*Primary Examiner*—Louis J. Casaregola
*Assistant Examiner*—Timothy S. Thorpe
*Attorney, Agent, or Firm*—Antonelli, Terry & Wands

[57] ABSTRACT

A premixing swirling burner including a burner body having a swirling member at one end for causing fuel introduced into the burner body to flow in vortical form through the swirling member, a burner outer frame mounting the burner body and communicated with an air line for introducing air into the burner body, and a cylindrical member located in the burner outer frame for enclosing the burner body, with an air passage being defined between the inner periphery of the cylindrical member and an outer periphery of a portion of the burner body. A premixing chamber is defined between an outer periphery of a central portion of the burner body and an inner periphery of the cylindrical member for providing a fuel-air premix flowing toward the swirling member. A fuel chamber introduces fuel into the interior of the burner body, and a fuel ejection nozzle is located along an outer surface of the central portion of the burner body. A channel defined between the inner periphery of an end portion of the cylindrical member and an outer peripheral portion of the burner body formed an inlet for the premixing chamber has a cross-sectional area smaller than a cross-sectional area of the air passage.

8 Claims, 7 Drawing Figures

PREMIXING SWIRLING BURNER

This is a continuation of application Ser. No. 386,278, filed June 8, 1982, now abandoned.

BACKGROUND OF THE INVENTION

This invention relates to swirling burners used with a gas turbine combustor, and, more particularly, to a premixing swirl burner suitable for use with a gas turbine combustor for performing combustion of a premix of fuel and air.

Oxides of nitrogen (NOx) released from various types of combustion facilities raise the problem of air pollution and environmental disruption. Particularly with regard to combustors for use with gas turbines, a program has been under way for diminishing generation of NOx by means of a dry process based on improvements of combustibility and a wet process using water and steam. However, in view of the fact that the generation of NOx in combustion is very complex, great difficulties are encountered in developing necessary technology and no decisively successful process has yet been developed and established as a new process for combustion. Particularly, although the dry process offers the advantage that no other medium is required (in the wet process, addition of water and steam is necessary), combustion by this process is under severe conditions of lean mixtures of fuel and air and low temperature. Thus, even if a reduction in NOx can be achieved to a certain extent, there is a concomitant rise if the amount of emission of CO. Generally the generation of NOx at the time of combustion is governed by the combustion gas of high temperature regions (of over 1800° C.) locally developing in the combustion zone and caused by oxidation of the unburned nitrogen in the exhaust emissions and also the nitrogen in the air of combustion. These nitrogen oxides are referred to as thermal NO and fuel NO, and the former particularly depends on oxyen concentration and reaction time and is considerably influenced by gas temperature. Thus, if it is possible to realize low temperature combustion (of about 1500° C.) in which no local high temperature regions exist, it would be possible to reduce NOx considerably in combustion.

Heretofore, it has been usual practice to use a system of combustion for reducing the generation of NOx for a gas turbine combustor in which excess air is introduced into the combustion zone to perform combustion with a lean mixture of fuel and air at low temperature. However some disadvantages are associated with this combustion system. In this combination system, difficulties are experienced in forming a uniform fuel-air mixture because combustion is sustained while air is mixed with fuel in diffusion mixing. In the process of combustion, enriched and lean areas tend to be formed in the fuel-air mixture and high temperature regions are formed as a result, so that it is impossible to achieve a marked reduction in NOx. Also, introduction of excess air results in supercooling of the flame surface, thereby causing an increase in the unburned components of the fuel, such as CO and rendering the combustion unstable. These phenomenons are largely accounted for by combustion of fuel-air mixtures of diffusion mixing. Thus, in order to obtain a dramatic reduction in NOx and CO in the exhaust emissions of combustion merely by changing the form of combustion, it is essential that a complete mixing of fuel and air be achieved before combustion to render the temperatures of flames uniform to avoid development of local high temperature regions in the mixture of fuel and air. This combustion system is generally referred to as a system of combustion of a premix of fuel and air in which fuel is mixed with air while being supplied to the combustor. In this premixing combustion system, the fuel-air mixture is combusted in an excess of air relative to the fuel, to thereby effectively reduce NOx and CO in the exhaust emissions.

The operation conditions for performing combustion by the above described premixing combustion system for the combustor of a gas turbine are as follows: combustion of a premix of fuel and air mainly takes place in the combustion chamber at the head of the combustor at partial load, and combustion of a fuel-air mixture at high load at or in the vicinity of the rated value takes place by burning a lean fuel-air mixture by simultaneously actuating a premixture swirling burner and a swing burner of the second stage located in the rear portion of the combustion chamber. Thus, the performances of the premixture swing burner and the swirling corner in the rear portion of the combustion chamber are important factors concerned in decoding the quality of combustion. In a gas turbine combustor, the range of operation from partial load to rated load is wide and any combustion would not be of any value unless the swirling burner shows a stable and excellent performance with respect to the ratio by weight of 0.004–0.018 of fuel to air. Moreover, the swirling burner should be of a type suitable for use in combustion at high flow velocity and high load and in a wide range of combustion, and has been in use as a flame protector for combustion of a fuel-air mixture of diffusion mixing at high load, such as in a gas turbine. However, in the combustion of a premix of fuel and air, there is considerable difficulty in controlling a change in the load over a wide range than the combustion of a mixture of fuel and air of diffusion mixing. Thus, if the load of a premix of fuel and air is increased to obtain full realization of advantages offered by the above described system in reducing NOx and CO in the exhaust emissions, the system would suffer the disadvantage that the region of partial load to be controlled would become wide in a gas turbine combustor, thereby reducing stability and reliability of a premixing burner as witnessed by a combustion loss of the burner head, for example. Thus, how to avoid a reduction in stability and reliability of combustion would be the problems that have to be one of avoided.

SUMMARY OF THE INVENTION

This invention has as its object the provision of a premixing swirling burner of a high rate of reduction of NOx in the exhaust emissions and a stable combustion characteristic which has high reliability in performance.

The outstanding characteristics of the invention are that, in a premixing swirling burner including a burner body having a swirling member at its end, there are provided an air supply line connected to an outer frame enclosing a central body portion of the burner body, a deflecting flow preventing cylinder located in the outer frame for covering the outer periphery of the central body portion of the burner body to reduce the dynamic pressure of air inflow, and a premixing chamber defined between the inner peripheral surface of the deflecting flow preventing cylinder and the outer peripheral surface of the central body portion of the burner body to allow fuel and air to be premixed with each other, wherein the deflecting flow preventing cyllinder is shaped such that an air channel on the inner peripheral side of an end portion of the deflecting flow prevent-cylinder constituting an inlet of the premixing chamber is smaller in area than an air passage on the outer peripheral side thereof, to thereby increase the flow velocity of an air current flowing into the premixing chamber and enable a stable combustion characteristic to be obtained.

DETAILED DESCRIPTION OF THE PREFERRED EMBODIMENTS

Figure 1:
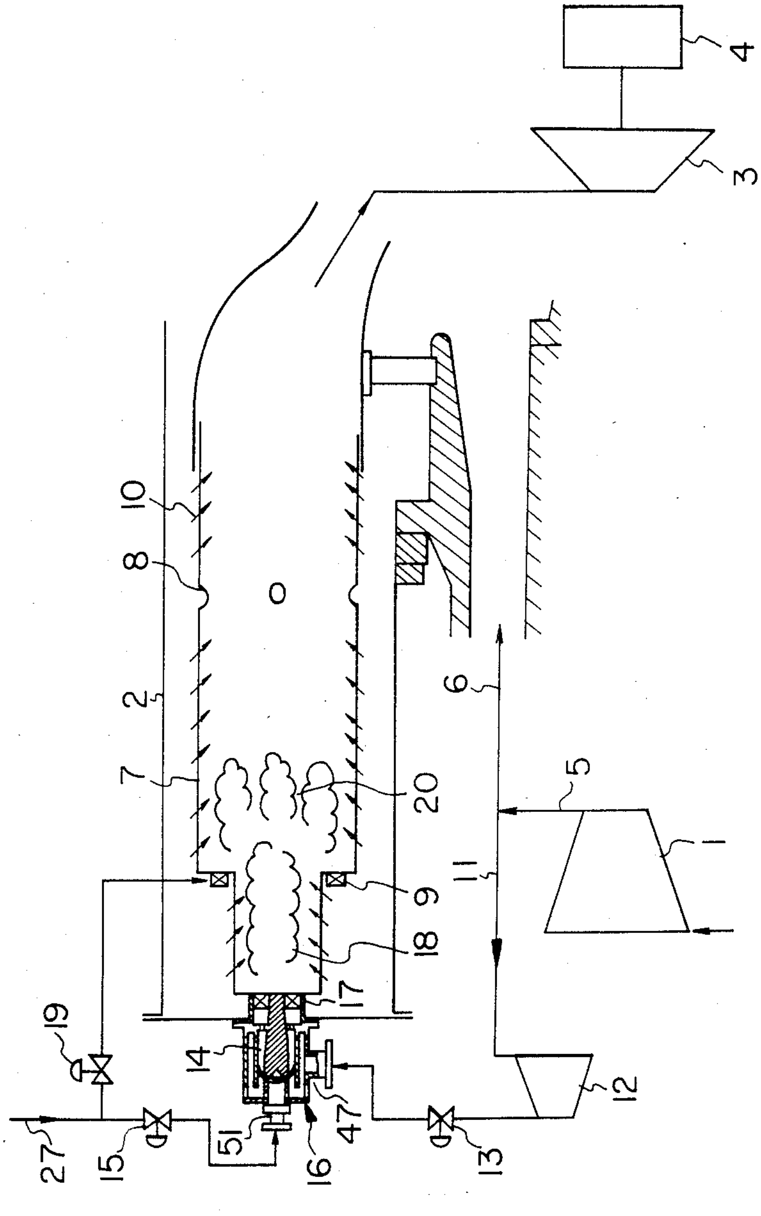
FIG. 1 is a schematic view of a gas turbine combustor comprising premixing swirling burner comprising one embodiment of the invention.

Referring now to the drawings wherein like reference numerals are used throughout the various views to designate like parts and, more particularly, to FIG. 1, according to this figure a gas turbine apparatus for burning liquified natural gas or coal gas comprises a compressor 1 for compressing air, a combustor 2 receiving a supply of compressed air 5 from the compressor 1 to burn fuel, a turbine 3 driven by combustion gas generated in the combustor 2, and a load 4 connected to the turbine 3. The compressed air 5 is introduced into the gas turbine apparatus in two ways. FIrst, the compressed air 5 is fed into the combustor 2 as compressed air 6 on the downstream side of the combustor 2 through diluting air apertures 8 formed at an inner cylinder 7 of the combustor 2 and through a swirling burner 9 of the second stage located in a rear combustion chamber 20 of the combustor 2. In the second way, it is fed into the combustor 2 as cooling air 10. A portion of the compressed air 5 is extracted as compressed air 11 which is introduced through a recompressor 12 and a control valve 13 into a premixing chamber 14 of a premixing swirling burner generally designated by the reference numeral 16 through an air inlet line 47. Fuel gas 27 is fed in part through a control valve 15 through a fuel inlet line 51 into the premixing chamber 14 where a predetermined volume of fuel gas 27 is mixed with the air current supplied thereto as the compressed air 11 to produce a premix of fuel and air which is ejected as a combustible fuel-air premix through a swirling member 17 of the premixing swirling burner 16 to enable combustion of the premix of fuel and air to take place in a front combustion chamber 18. The rest of the fuel gas 27 is fed through a control valve 19 to the swirling burner 9 of the second stage in the rear combustion chamber 20 which ejects the fuel gas together with the air to enable combustion of a lean mixture of fuel and air to take place at low temperature in the rear combustion chamber 20. During combustion, the cooling air 10 is introduced through the cooling air apertures formed at the inner cylinder 7 of the combustor 2 to obtain improved cooling of the wall of the inner cylinder 7 and increased uniformity of the combustion gas temperature. The air is also introduced through the diluting air apertures 8 into the rear combustion chamber 20 to bring the temperature of the combustion gas to a preset level.

Figure 3:
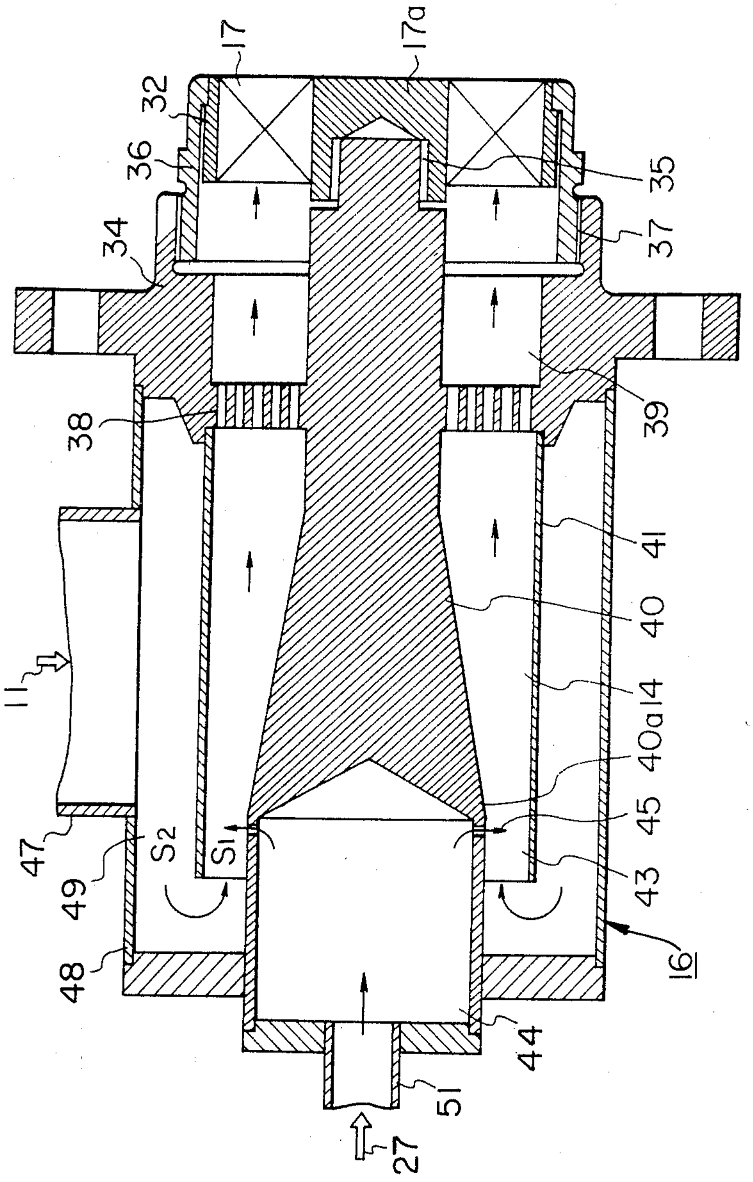
FIG. 3 is a cross sectional view of the premixing swirling burner constructed in accordance with another embodiment of the present invention.

As shown in FIGS. 1 and 3, the premixing swirling burner 16 is mounted in the front combustion chamber 18 of the combustor 2 and comprises a premixing swirling member 17, fuel gas ejecting openings 45 located upstream of the swirling member 17, a fuel gas chamber 44 and a fuel-air premix chamber 14, with the chamber 44,14 the being coaxially disposed. The fuel gas 27 and the air 11 are fed through the control valves 15 and 13 respectively into the burner and ejected by the swirling member 17 into the front combustion chamber 18 of the combustor 2.

Figure 2:
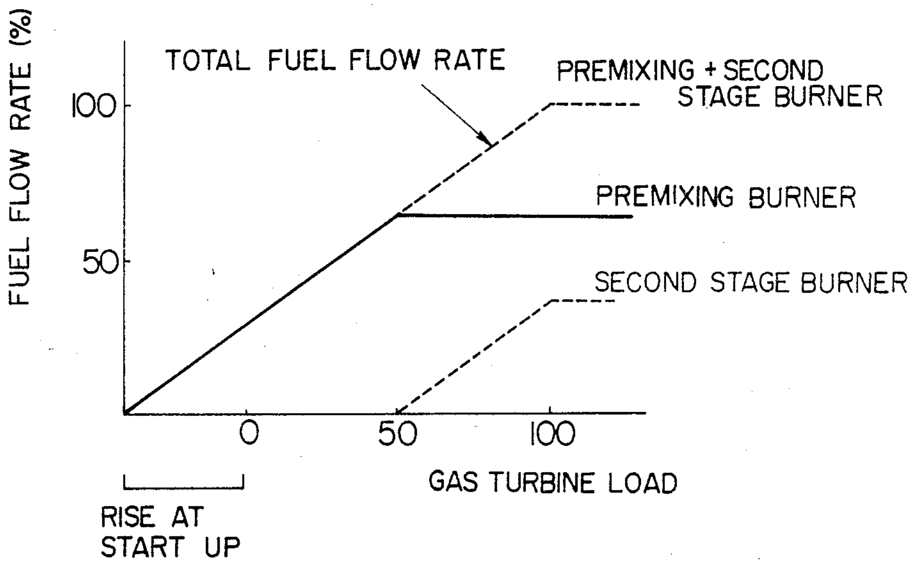
FIG. 2 is a diagrammatic representation of a relatioship between a flow rate of fuel and a gas turbine load indicating a fuel control system for the gas turbine combustor of FIG. 1.

As shown in FIG. 2, combustion of a premix of fuel and air is allowed to take place largely by the operation of the premixing swirling member 17 up to a partial load, i.e., about ½ the turbine load of the gas turbine 3. Thereafter combustion of a lean mixture of fuel and air is allowed to take place at low temperature in a stable manner at a rated load (100%) by ejecting fuel and air through the swirling burner 9 in the second stage rear combustion chamber 20. To enable the combustion to take place, it is important that combustion of a premix of fuel and air be allowed to take place in the premixing swirling burner 16 in excellent condition and in a stable manner at all times from ignition to a partial load range of operation of the turbine. To this end, it is essential that no backfire occur at low load, i.e. that combustion takes place stably in a relatively lean premix range, i.e. air excess rate $\lambda > 1.2$, that complete premixing of fuel and air can be obtained, and that the construction is simple with a low pressure loss.

To attain this end, the premixing swirling burner 16, as shown in FIG. 3 is constructed such that the swirling member 17 includes a swirling body **17*a* formed with a plurality of swirling blades having a swirling angle $\beta$, and a blade support ring 32. The swirling body 17*a* is secured to a burner body 34 by a threaded portion 35 at the central portion thereof. The blade support ring 32 at the outer periphery of the swirling member 17 has a burner cap 36 at a forward end portion thereof, with the swirling member 17 being secured by a burner body threaded portion 37 in socket-and-spigot joint. A porous plate 38 is located in a partition section in an upstream end portion of the burner body 34, and an annular hollow portion 39 is formed downstream of the porous plate 38, with the annular hollow portion 39 defining a fuel-air mixture passage. The burner body 34 is formed in a central portion thereof, upstream of the porous plate 38, with a central body portion 40 tapering in a direction of an upstream end 40*a* thereof so that the upstream end of the central body portion 40 has the largest outer diameter. A cylindrical deflecting flow preventing member 41 is provided to enclose the outer periphery of the central body portion 40 of the burner body 34 to thereby define the premixing chamber 14. The premixing chamber 14 is configured such that the area of the premixing chamber 14 for the fuel-air premix to flow therein successively increases in going toward the downstream end of the burner body 34. Thus, the fuel gas 27 and the air 11 are mixed in the premixing chamber 14 by a mechanism located in an air channel 43 having a minimum a cross-sectional area $S_1$ in a vicinity of the maximum diameter upstream end 40***a* of the body portion 40 and the forward end of the deflecting flow preventing cylindrical member 41. The mechanism comprises a fuel gas chamber 44 located upstream of the maximum diameter end 40*a* of the body portion 40. The fuel gas chamber 44 has ejecting openings 45 located in a vicinity of the air channel 43, with the ejecting opening 45 being directed against the inner wall surface of the deflecting flow preventing cylindrical member 41. In this construction, the air 11 is led through the air inlet 47 into an annular air passage 49 having a cross-sectional area $S_2$, with the annular air passage 49 being defined between an outer frame 48 of the burner and the wall of the deflecting flow preventing cylindrical member 41, from which it is introduced into the premixing chamber 14 from the upstream end through the air channel 43. The air inlet line 47 is arranged so as to be perpendicular to the deflecting flow preventing cylindrical member 41, so that the air introduced through the air inlet line 47 in a current can have its force weakened as it impinges on the wall of the flow preventing member 41 to prevent the air current from flowing in deflecting streams as it is introduced into the premixing chamber 14. To this end, the deflecting flow preventing cylindrical member 41 has its end portion extended axially outwardly as much as possible to bend the current of air 11 before it is introduced into the premixing chamber 14. The air passage 49 has a cross-sectional area $S_2$ greater than the cross-sectional area $S_1$ of the air channel 43 communicating the air inlet line 47 with the premixing chamber 14, so that the air current flowing into the premixing chamber 14 has its flow velocity increased to thereby accelerate mixing of the air with the fuel gas 27.

Meanwhile the fuel gas 27 is introduced through a fuel gas inlet line 51 into the fuel gas chamber 44 and ejected therefrom through the fuel gas ejecting openings 45 in streams that cut at right angles the air current led into the premixing chamber 14 to obtain premixing of the fuel with the air. The reason why the central body portion 40 in the central portion of the burner has its maximum diameter portion 40*a* located at the fuel inlet end is because it is intended to minimize the gap between the inner wall surface of the deflecting flow preventing cylindrical member 41 and the outer peripheral surface of the central body portion 40. By this arrangement, air current can effectively penetrate the streams of fuel gas 27 ejected through the gas ejecting openings 45 or shear the same with increased strength to accelerate mixing. The premix of fuel and air thus produced flows through the premixing chamber 14 while further undergoing mixing in diffusion mixing and flows through the porous plate 38 to have mixing accelerated while rendering the mixture uniform, so that the fuel and air can be completely formed into a combustible premix of fuel and air before reaching the swirling member 17.

As described hereinabove, the premixing swirling burner according to the invention is characterized by the feature that the premix of fuel and air is led to the swirling member 17 after flowing through the porous plate 38 disposed to the rear of the mixing mechanism for the fuel gas 27 and air 11 and the premixing chamber 14. Particularly the provision of the deflecting flow preventing cylindrical member 41 makes it possible to prevent the air 11 introduced in one direction into the burner from flowing in deflecting streams and at the sme time allows the mixing mechanism and the premixing chamber to be located coaxially while being separated from each other as different entities. This arrangement enables a thorough and uniform mixing of the fuel gas and air to be obtained without providing the porous plate 38 in a plurality of stages, thereby permitting the construction to be simplified without the risk of increasing the pressure loss by the fluidity of the mixture. By setting the diameter of the apertures formed in the porous plate 38 at a level such that the flame port is below the combustion load of the burner, it is possible to keep a backfire from spreading to the upstream side of the porous plate 38 in the event of it occurring in the burner. Particularly the arrangement that the central body portion 40 located in the premixing chamber 14 is configured in a manner so as to cause the area of the channel in the premixing chamber 14 to successively increase in going toward the downstream end on the upstream side of the porous plate 38, so that the flow velocity of the premix of fuel and air in the premixing chamber 14 is higher on the upstream end of the chamber 14 than on the downstream end thereof. Thus, even if a spread of backfire into the premixing chamber 14 cannot be prevented by the porous plate 38, the flames would draw back from the premixing chamber 14 because of the increasing high flow velocity of the premix of fuel and air with which the backfire has to contend in flowing inwardly of the premixing chamber, thereby avoiding spread of the backfire to the entire burner.

Figure 4:
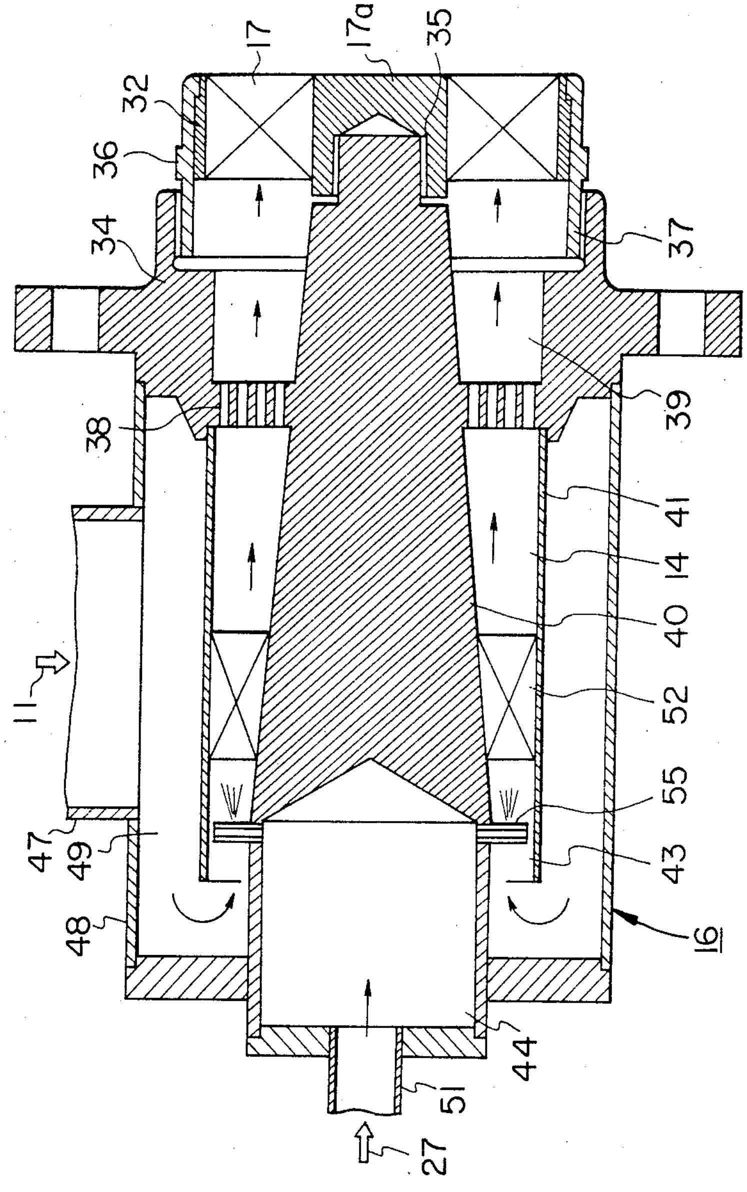
FIG. 4 is a cross sectional view of the premixing swirling burner constructed in accordance with a further embodiment of the present invention.

In this case, the cross-sectional area of the minimun channel section 43 of the premixing chamber 14 on the inner peripheral side of the deflecting flow preventing cylindrical member 41 is set at a value smaller than that of the cross-sectional area of the ejection opening of the swirling member 17. By this arrangement, it is possible to avoid the occurrence of backfire with respect to changes in the load applied to the outlet end of the swirling member 17. The cross-sectional area of the ejection opening of the swirling member 17 need be set in such a manner that the flow velocity of the stream of fuel-air premix is in a stable operation range of the combustor 2. In FIG. 4, the fuel gas chamber 44, located on the upstream end of the burner body, has fuel gas spray nozzle means 55 in the form of tubes extending therefrom into the premixing chamber 14 on the inner peripheral side of the inlet portion of the deflecting flow preventing cylindrical member 41 defining the premixing chamber 14. By arranging the fuel gas spray nozzle means 55 on the upstream end of the channel in the premixing chamber 14 in this way, it is possible to obtain good diffusion mixing of the fuel gas with the air flowing through the premixing chamber 14 by suitably ejecting jet streams of fuel gas in accordance with the size of the air current flowing through the premixing chamber 14. Stated differently, it is possible to positively keep the concentration of fuel gas from becoming unbalanced with respect to that of air flowing in an air current. The provision of the fuel gas spray nozzle means 55 in the form of tubes is advantageous in accelerating premixing of fuel and air because a wake is formed on the upstream side of the spray means 55 projecting into the channel in the premixing chamber 14.

In the embodiment of the premixing swirling burner shown in FIG. 4, premixing swirling blades 52 are located midway in the channel in the premixing chamber 14. The provision of the premixing swirling blades 52 in the channel of a short length in the premixing chamber 14 enables premixing of fuel and air to positively take place. The premixing swirling blades 52 causes a turbulent flow to occur in the air current in the premixing chamber 14 to thereby accelerate premixing of the fuel gas with the air, and causes the premix of fuel and air to stay over a prolonged period of time in the premixing chamber 14 by causing the premix to flow in vortical form, to thereby increase the uniformity of the premix of fuel and air.

Figure 5:
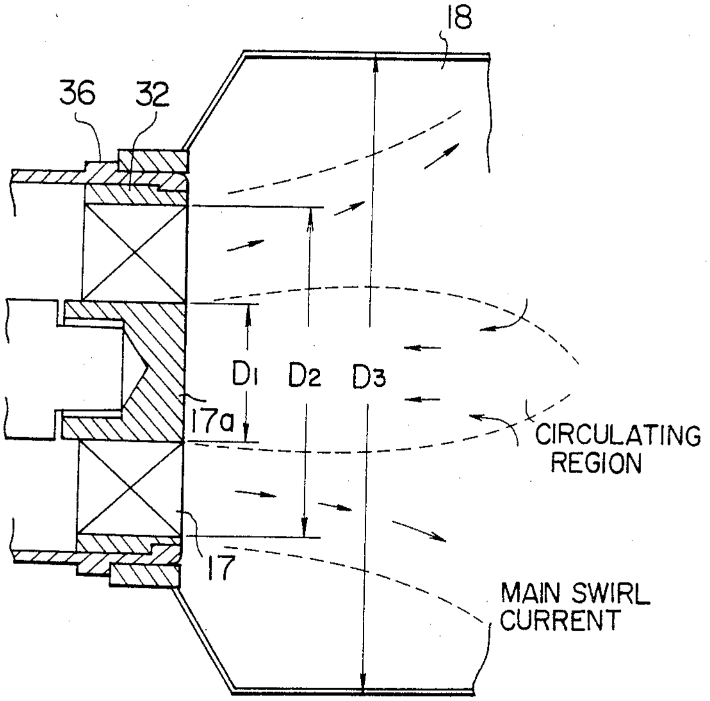
FIG. 5 is a fragmentary cross sectional view of the swirling member of the premixing swirling burner shown in FIGS. 3 and 4.

The swirling member 17 of the premixing swing burner according to the invention will be described in detail. The swing member 17 of the embodiments shown in FIGS. 3 and 4 has, as shown on an enlarged scale in FIG. 5, a boss ratio $D_1/D_2$ of 0.44 which is smaller than the boss ratio of 0.5–0.7 of swing members of burners of the prior art and a ratio of the inner diameter of the swing member 17 to that of the front combustion chamber 18 $D_2/D_3$ of 0.64 which is larger than the corresponding ratio of 0.5 of swing members of burners of the prior art. Also, the swing member 17 has a large swing angle of 45 degrees. The reason for this is because it is desired to increase the flame sustaining performance of the burner. More specifically, with a large swing angle, the swing member 17 has an increased outer diameter of its swinging portion with respect to the inner diameter of the front combustion chamber 18, so as to enlarge the circulating flow region formed in the front combustion chamber 18 by the vortical flow of a fuel-air premix and enable combustion to take place stably over a wide range of fuel-air premix.

Figure 6:
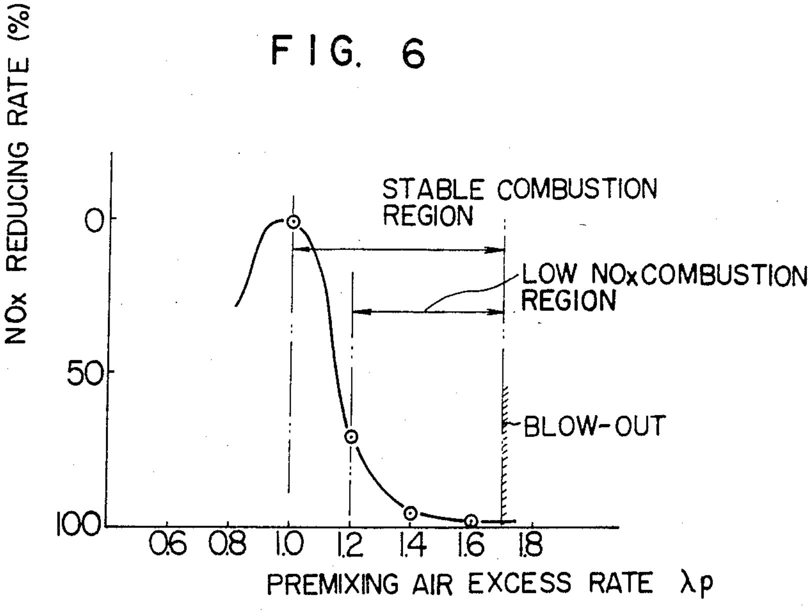
FIG. 6 is a diagrammatic representation of the combustion characteristics of the premixing swirling burner shown in FIGS. 3 and 4.

FIG. 6 shows the results of experiments on combustion conducted with the embodiment of the premixing swing burner shown in FIG. 4. As can be clearly seen in the figure, the upper limit blow-out excess rate $\lambda_p$ of the burner is about 1.7. The higher the upper limit blow-out excess rate $\lambda_p$, the higher is the NOx reducing rate. It has been ascertained as the results of the experiments that in order to simultaneously meet the requirements of reducing NOx by 70% and causing combustion to take place stably, it is possible to obtain combustion of high stability and reliability if, as shown in FIG. 6, the premixing swing burner according to the invention has an upper limit blow-out excess air rate $\lambda_p$ in the range between about 1.2 and 1.6.

Figure 7:
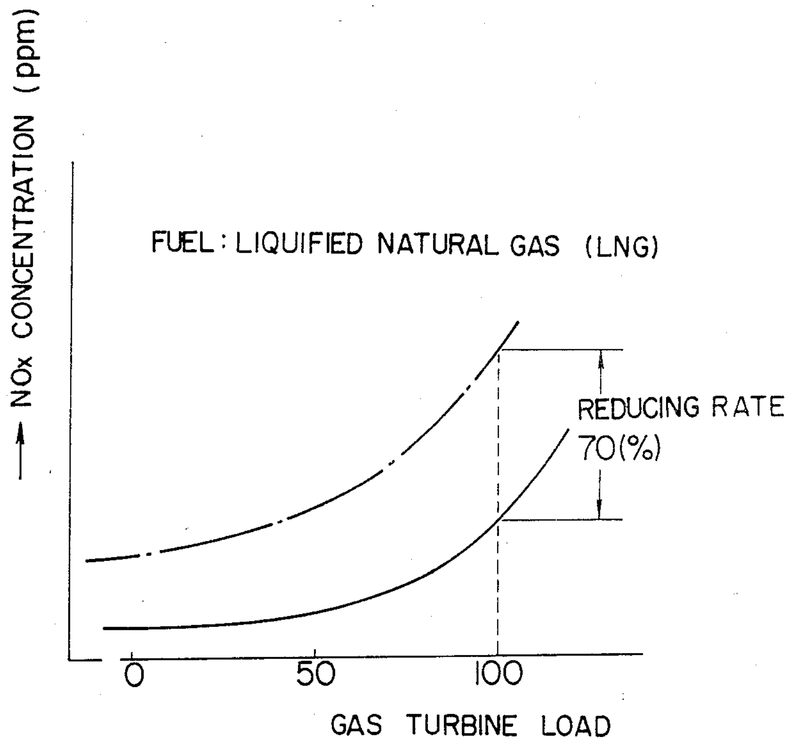
FIG. 7 is a diagrammatic representation of the relationship between the NOx concentration and the gas turbine load in the gas turbine combustor shown in FIG. 1.

FIG. 7 shows the results of experiments conducted on combustion by means of the combustor equipped with the premixing swing burner according to the invention as shown in FIG. 1, with the swing burner 9 of the second stage of the rear combustion chamber 20 being actuated. In the figure, it will be seen that the combustor equipped with the premixing swing burner according to the invention represented by a solid line is better able to achieve an NOx reducing rate of 70% than a combustor of the lean mixture combustion system of the prior art indicated by a dash-and-dot line. It will also be seen that the combustor equipped with the premixing swing burner according to the invention has a combustion load rate which is about twice as high as that of a combustor of the diffusion combustion system of the prior art, thereby indicating that premixing of gaseous fuel and air provides marked improvements in the performance of the combustor. In the combustor provided with the premixing swing burner according to the invention represented by the solid line, the premixing swing burner has an upper limit blow-out air excess rate $\lambda_p$ of 1.5.

From the foregoing description, it will be appreciated that the premixing swing burner according to the invention enables the amount of NOx in exhaust emissions to be reduced while permitting combusiton to be sustained stably.

What is claimed is:

1. A premixing swirling burner comprising:

a burner body including a swirling member located at a downstream end thereof for causing fuel introduced into the burner body to flow in vortical form through said swirling member;

a burner outer frame means for mounting said burner body therein;

a cylindrical member located in said burner outer frame means for enclosing an outer periphery of a central body portion of said burner body;

an air passage formed between an inner periphery of said outer frame means and an outer periphery of said cylindrical member;

air inlet means disposed on said outer frame means and communicating with said air passage for enabling an introduction of air into the burner body;

a premixing chamber defined upstream of said swirling member between the outer periphery of the central body portion of said burner body and an inner periphery of said cylindrical member for mixing air introduced through said air inlet means to provide a fuel-air premix flowing toward said swirling member; and channel means disposed on the inner peripheral side of an upstream end portion of said cylindrical member for forming an inlet for the premixing chamber, said channel means being in communication with said air passage, and wherein a fuel chamber means is provided for introducing the fuel into the interior of said burner body, and fuel ejection means are located on the outer peripheral surface of the central body portion of said burner body in the vicinity of said channel means for injecting fuel into an air current flowing through said channel means into the premixing chamber whereby fuel and air are introduced into the premixing chamber, said channel means has a cross-sectional area smaller than a cross-sectional area of said air passage.

2. A premixing swirling burner as claimed in claim 1, wherein said air inlet means is directed such that it intersects said cylindrical member in a manner so as to cause an air current flowing into said air passage through the air inlet means to impinge on the outer peripheral surface of said cylindrical member.

3. A premixing swirling burner as claimed in claim 1, wherein at least one of said cylindrical member and said central body portion of said burner body are configured and arranged such that a cross-sectional area of a portion of said premixing chamber successively decreases in a direction toward the inlet for the premixing chamber.

4. A premixing swirling burner as claimed in claim 3, wherein said central body portion of said burner body is configured and arranged such that an outer periphery thereof tapers outwardly in a direction toward the inlet for the premixing chamber such that the central body portion has the largest diameter in an area of said inlet for the premixing chamber.

5. A premixing swirling burner as claimed in claim 1, further comprising a porous plate means arranged in said premixing chamber for accelerating a mixing of the fuel-air premix in the premixing chamber and rendering the premix uniform.

6. A premixing swirling burner as claimed in claim 1, further comprising swirling blades located in said premixing chamber.

7. A premixing swirling burner comprising:

a burner body including a swirling member located at a downstream end thereof for causing fuel introduced into the burner body to flow in vortical form through said swirling member;

a burner outer frame means for mounting said burner body therein;

a cylindrical member located in said burner outer frame means for enclosing an outer periphery of a central body portion of said burner body;

an air passage formed between an inner periphery of said outer frame means and an outer periphery of said cylindrical member;

an air inlet means disposed on said outer frame means and communicating with said air passage for enabling an introduction of air into said burner body;

a premixing chamber defined upstream of said swirling member between the outer periphery of the central body portion of said burner body and an inner periphery of said cylindrical member for mixing air introduced through said air inlet means with fuel to provide a fuel-air premix flowing toward said swirling member;

a fuel chamber means for introducing the fuel into the interior of said burner body;

channel means disposed on the inner peripheral side of an end portion of said cylindrical member for forming an inlet for the premixing chamber whereby fuel and air are introduced into the premixing chamber, said channel means has a cross sectional area smaller than a cross-sectional area of the air passage;

fuel ejection means located on the outer peripheral surface of the central body portion of said burner body in a vicinity of the inlet for the premixing chamber for ejecting fuel into an air current flowing through said inlet into the premixing chamber;

at least one of said cylindrical member and said central body portion of said burner body being configured and arranged such that a cross-sectional area of a portion of said premixing chamber successively decreases in a direction toward the inlet for the premixing chamber;

swirling blade means located in said premixing chamber for swirling the fuel-air premix in the premixing chamber; and a porous plate means disposed in said premixing chamber at a position upstream of said swirling blade means, as viewed in a normal flow direction of the fuel and air premix through the premixing chamber, for accelerating a mixing of the fuel-air premix and rendering the premix uniform.

8. A premixing swing burner as claimed in claim 7, wherein said premixing swirling burner is a burner of a gas turbine combustor.

* * * * *